US008755627B2

(12) United States Patent
Sellers et al.

(10) Patent No.: US 8,755,627 B2
(45) Date of Patent: Jun. 17, 2014

(54) METHOD AND SYSTEM FOR REDUCING SPECKLES IN A CAPTURED IMAGE

(75) Inventors: Ronald Todd Sellers, Stamping Ground, KY (US); Khageshwar Thakur, Lexington, KY (US); Steven Frank Weed, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 314 days.

(21) Appl. No.: 13/086,814

(22) Filed: Apr. 14, 2011

(65) Prior Publication Data

US 2012/0263395 A1  Oct. 18, 2012

(51) Int. Cl.
*G06K 9/40* (2006.01)
*H04N 5/217* (2011.01)

(52) U.S. Cl.
USPC ............ 382/274; 382/260; 382/262; 348/241

(58) Field of Classification Search
USPC ............... 382/117, 165, 167, 190, 199, 219, 382/260–266, 274, 275; 348/966, 971, 973, 348/974, 975, 980; 358/450, 475, 509, 207
See application file for complete search history.

(56) References Cited

U.S. PATENT DOCUMENTS

| | | | | |
|---|---|---|---|---|
| 5,832,009 A * | 11/1998 | Kikuchi | | 372/21 |
| 6,072,889 A * | 6/2000 | Deaett et al. | | 382/103 |
| 7,860,306 B2 * | 12/2010 | Mallick et al. | | 382/163 |
| 7,995,828 B2 * | 8/2011 | Wang et al. | | 382/132 |
| 2001/0002850 A1 * | 6/2001 | Slatter | | 348/370 |
| 2002/0113882 A1 * | 8/2002 | Pollard et al. | | 348/239 |
| 2003/0036703 A1 * | 2/2003 | Li | | 600/437 |
| 2005/0046872 A1 * | 3/2005 | Hu et al. | | 356/603 |
| 2005/0276508 A1 * | 12/2005 | Coleman et al. | | 382/275 |
| 2008/0080785 A1 * | 4/2008 | Ford | | 382/275 |
| 2008/0152248 A1 * | 6/2008 | Kelly | | 382/260 |
| 2008/0181476 A1 * | 7/2008 | Aysal et al. | | 382/128 |
| 2012/0162438 A1 * | 6/2012 | Thakor et al. | | 348/161 |

OTHER PUBLICATIONS

Feris, R.; Raskar, R.; Kar-Han Tan; Turk, M., "Specular reflection reduction with multi-flash imaging," Computer Graphics and Image Processing, 2004.Proceedings. 17th Brazilian Symposium on, vol., No., pp. 316,321, Oct. 17-20, 2004.*
Iwai, T.; Asakura, T., "Speckle reduction in coherent information processing," Proceedings of the IEEE , vol. 84, No. 5, pp. 765,781, May 1996.*
Georg Petschnigg, Richard Szeliski, Maneesh Agrawala, Michael Cohen, Hugues Hoppe, and Kentaro Toyama. Digital photography with flash and no-flash image pairs. In SIGGRAPH '04: ACM SIGGRAPH 2004 Papers, pp. 664-672, New York, NY, USA, 2004. ACM.*

* cited by examiner

*Primary Examiner* — Andrae S Allison

(57) ABSTRACT

A method for reducing specular reflection in an image. The method includes capturing a first exposure of a scan surface using a first of a plurality of light sources, capturing a second exposure of a scan surface using a second of a plurality of light sources, determining which pixels captured by the light sources are speckles, and replacing a value of at least one speckle in the image with a different pixel value.

18 Claims, 5 Drawing Sheets

METHOD AND SYSTEM FOR REDUCING SPECKLES IN A CAPTURED IMAGE

CROSS REFERENCE TO RELATED APPLICATION

None.

BACKGROUND

1. Field of the Disclosure

The present invention relates to printing, and, more particularly, to image processing.

2. Description of the Related Art

Image capture systems are used in a variety of applications. Such systems may be combined in an all-in-one unit that includes image capture, image formation, and facsimile functions. Image capture systems may also be independent and only capable of performing an image capture function. Digital photograph technology has progressed with imaging units now able to produce high quality two dimensional images in a single step process. The imaging units are also economical allowing them to be utilized in new applications, such as document scanning technology.

Conventional image capture systems utilizing digital photograph technology include a single light source that illuminates a scan surface and a camera that captures an image of the scan surface. Micro structures in the scan surface may cause salt and pepper noise, such as spikes, speckles or random specular reflection to be captured by the camera. One of the conventional techniques to remove salt and pepper noise is a median filter. A disadvantage of this technique, however, is blurring of images because known filter methods fail to determine whether the pixel to be corrected is noisy. This is due in part to the fact that it may be difficult to distinguish noise from image feature.

Accordingly, it will be appreciated that an image capture system that reduces specular reflection or speckles is desired.

SUMMARY

Having exposures from multiple light sources presents a unique opportunity to distinguish image features from speckles.

Disclosed herein is a method for reducing specular reflection in an image. The method includes capturing a first exposure of a scan surface using a first of a plurality of light sources, capturing a second exposure of a scan surface using a second of a plurality of light sources, determining which pixels captured by the light sources are speckles, and replacing a value of at least one speckle in the image with a different pixel value.

In one example embodiment, the different may correspond to the pixel value of the speckle in the second exposure. In another example embodiment, the different pixel value may correspond to a median pixel value of the neighboring pixels to the speckle. In yet another example embodiment, the different pixel value may correspond to the pixel value of the speckle in the second exposure plus a smooth difference between neighboring pixels to the speckle.

BRIEF DESCRIPTION OF THE DRAWINGS

The above-mentioned and other features and advantages of the various embodiments of the invention, and the manner of attaining them, will become more apparent and will be better understood by reference to the accompanying drawings, wherein.

DETAILED DESCRIPTION

Figure 1:
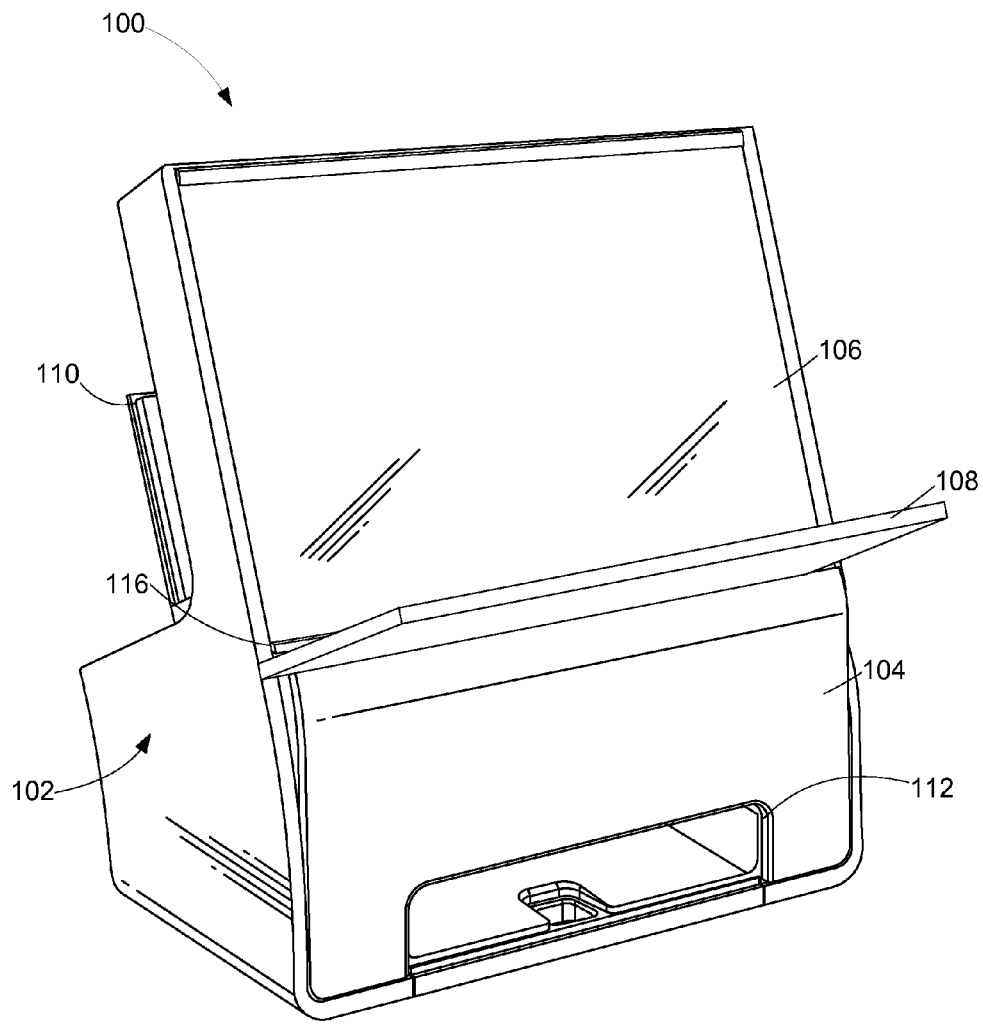
FIG. 1 is a perspective view of an imaging device according to one example embodiment.

The following description and drawings illustrate embodiments sufficiently to enable those skilled in the art to practice the present disclosure. It is to be understood that the disclosure is not limited to the details of construction and the arrangement of components set forth in the following description or illustrated in the drawings. The disclosure is capable of other embodiments and of being practiced or of being carried out in various ways. For example, other embodiments may incorporate structural, chronological, electrical, process, and other changes. Examples merely typify possible variations. Individual components and functions are optional unless explicitly required, and the sequence of operations may vary. Portions and features of some embodiments may be included in or substituted for those of others. The scope of the application encompasses the appended claims and all available equivalents. The following description is, therefore, not to be taken in a limited sense, and the scope of the present disclosure is defined by the appended claims.

Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings. Further, the terms "a" and "an" herein do not denote a limitation of quantity, but rather denote the presence of at least one of the referenced item.

Reference will now be made in detail to the example embodiment(s), as illustrated in the accompanying drawings. Whenever possible, the same reference numerals will be used throughout the drawings to refer to the same or like parts.

FIG. 1 illustrates a perspective view of an imaging device 100 embodying one example embodiment. Imaging device 100, which may be a standalone imaging device, includes a housing 102 having a front portion 104 including an image capture window 106. Image capture window 106 may be constructed from a rigid, transparent and/or translucent material, such as glass.

Imaging device 100 may also include a lid 108 pivotably connected to the front portion 104 of the housing 102. The lid 108 may be pivotably connected along a bottom edge of the front portion 104 of the housing 102 via hinges or the like (not shown) to allow the lid 108 to swing relative to the image capture window 106 so that the lid 108 may cover the image capture window 106 in a closed position and uncover the image capture window 106 in an open position. The back portion of the imaging device 100 may have an input media tray 110 that may retain one or more print media sheets therein. A media output area 112 may be positioned along a lower part of front portion 104.

According to an example embodiment, image capture window 106 may be disposed in an inclined position at an acute angle relative to the horizontal. Front portion 104 of housing 102 may also include a ledge (not shown) on which a sheet of media may rest when positioned against image capture window 106 when the lid is in the open position. Once the media sheet is properly positioned, the lid may be closed so that image on the media sheet may be captured.

Figure 2:
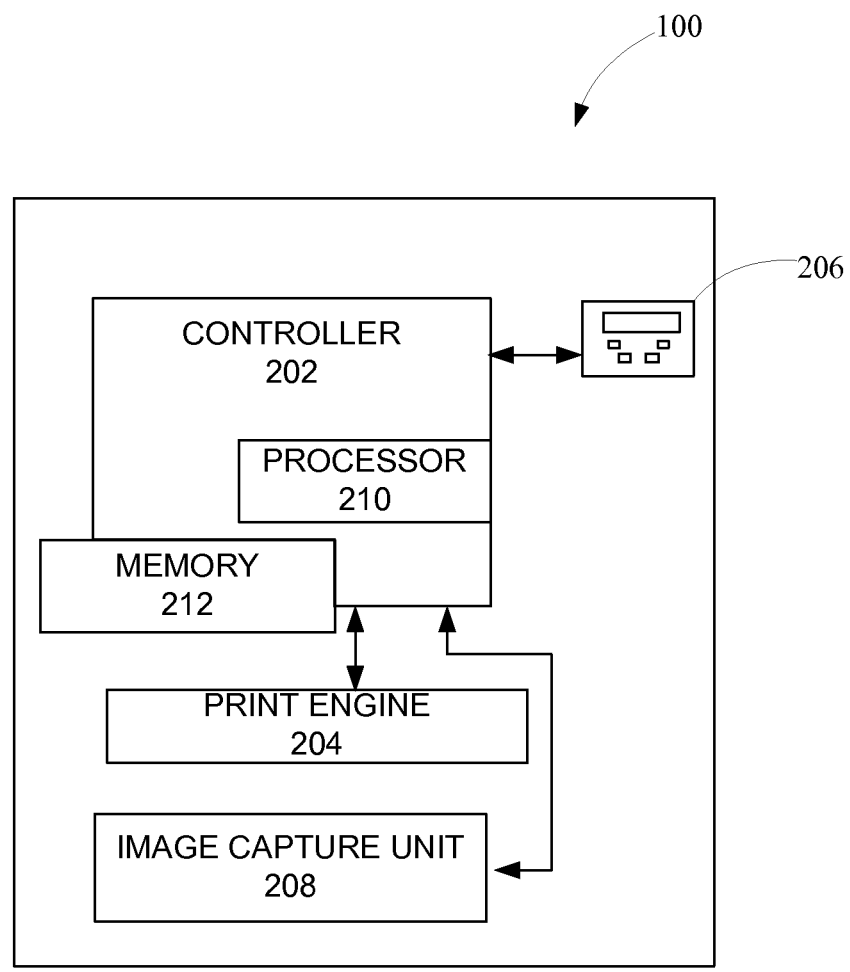
FIG. 2 is a block diagram depicting at least some of the components of the imaging device in FIG. 1.

FIG. 2 is a block diagram depicting at least some of the main components of imaging device 100. Imaging device 100 may include a controller 202 communicatively coupled to a print engine 204, a user interface 206, and an image capture unit 208. Controller 202 may include a processor unit 210 and associated memory 212 and may be formed as one or more Application Specific Integrated Circuits (ASICs). Memory 212 may be any memory device convenient for use with controller 202. Controller 202 may be, for example, a combined printer and image capture controller. Processor unit 210 may be capable of image processing.

Imaging device 100 may include one or more mechanisms (not shown) for picking a sheet of media from input media tray 110, moving the picked sheet to a location adjacent print engine 204 for printing an image thereon, and moving the picked sheet having the printed image to media output area 114. During advancement, the picked media sheet moves from the input media tray 112 to media output area 114 along a substantially L-shaped media path. However, it is understood that a C-shaped media feedpath configuration, a straight-through feedpath or other media feedpath configuration may be utilized.

Controller 202 may communicate with print engine 204. Controller 202 may serve to process print data and to operate print engine 204 during printing of an image onto a sheet of media. Print engine 204 may include any of a variety of different types of printing mechanisms including dye-sublimation, dot-matrix, ink-jet or laser printing. For ease of description, print engine 204 may be an inkjet printing device although such description should not be considered limiting. Print engine 204 may include a carriage (not shown) for holding at least one print cartridge. According to one example embodiment, two print cartridges 212 may be utilized wherein, by way of example, a color cartridge is utilized for color printing and a black cartridge for monochrome printing. As one skilled in the art will recognize, the color cartridge may include three inks, i.e., cyan, magenta and yellow inks. Alternatively, a single black cartridge may be used.

In another alternative embodiment, one or more printheads (not shown) may be disposed in the movable carriage and one or more stationary ink tanks may be in fluid communication with the one or more printheads. In yet another alternative embodiment, at least one stationary printhead assembly is disposed substantially entirely across the media path of imaging device 100 and at least one ink tank may be in fluid communication with the printhead assembly, for providing page-wide printing.

Imaging device 100 may include a user interface 206, such as a graphical user interface, for receiving user input concerning operations performed or to be performed by imaging device 100, and for providing to the user information concerning same. The user interface 206 may include firmware maintained in memory 210 within housing 102 which may be performed by controller 202 or other processing element. In an example embodiment, the user interface 206 may include a display panel (not shown), which may be a touch screen display in which user input may be provided by the user touching or otherwise making contact with graphic user icons in the display panel. In one embodiment, the display panel may be disposed along the outer surface of lid 108 and sized for providing graphic images that allow for convenient communication of information between imaging device 100 and the user. Alternately, input keys (not shown) may be provided to receive user input.

Figure 3:
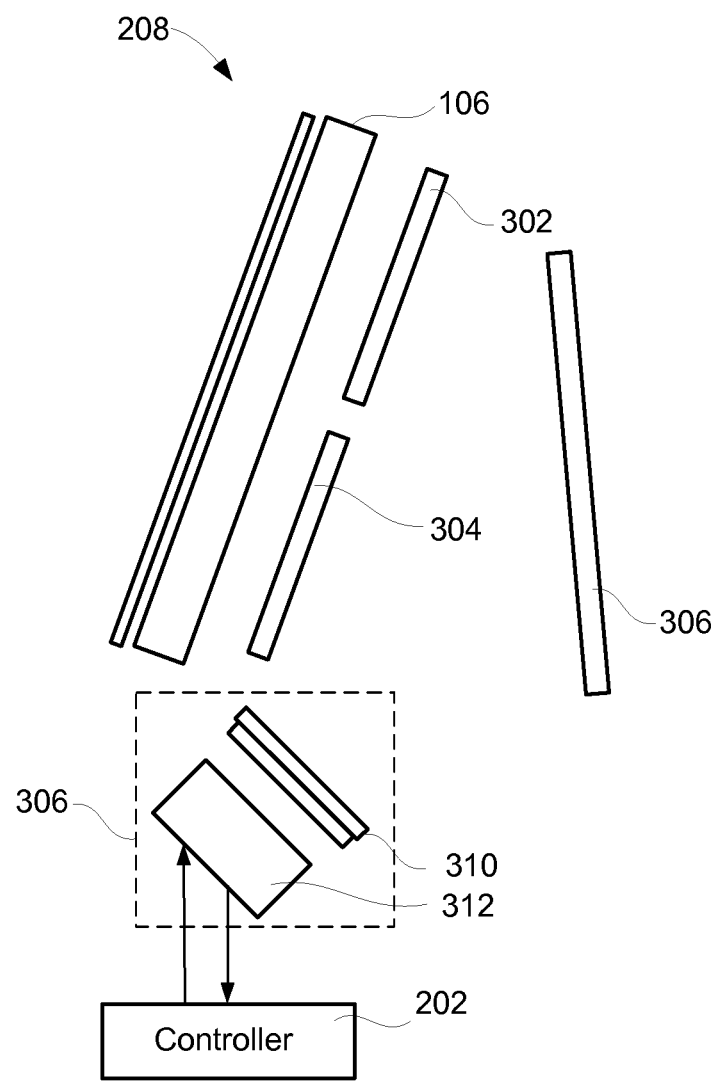
FIG. 3 is a perspective view of an image unit according to a first example embodiment.

FIG. 3 illustrates a portion of the image capture unit 208 for capturing the image of a media sheet S placed against image capture window or scan surface 106. At least two assemblies, illuminating devices or illuminators 302, 304 generate the light that is reflected from media sheet S for subsequent capture. In an example embodiment, illuminators 302, 304 may be arranged about and in proximity with image capture window 106 so that a sufficient amount of light is directed towards media sheet S. Each of the illuminators 302, 304 may include at least one light source, such as an LED or a lightbulb. Alternately, each of the illuminators 302, 304 may include at least one set of red, green and blue LEDs. Associated with each of the illuminators 302, 304 may be optics (not shown) for focusing and/or filtering light generated by the illuminators 302, 304.

With further reference to FIG. 3, a mirror 306 may be disposed behind image capture window 106 within housing 102. Mirror 306 is dimensioned and oriented for deflecting light reflected by media sheet S. A camera 308, which may include a lens module 310 and an optical sensor array 312, may be disposed in optical communication with mirror 306 so that light reflected by mirror 306 is focused by lens module 310 towards optical sensor array 312. Optical sensor array 310 may include a sufficient number of pixel elements for capturing at one time a substantially entire image of media sheet S.

Controller 202 may be communicatively coupled to camera 308 and illuminators 302, 304 for controlling each during an image capture operation. In particular, controller 202 may control the activation of illuminators 302, 304 relative to the time period during which camera 308 captures light deflected from mirror 306.

Figure 4:
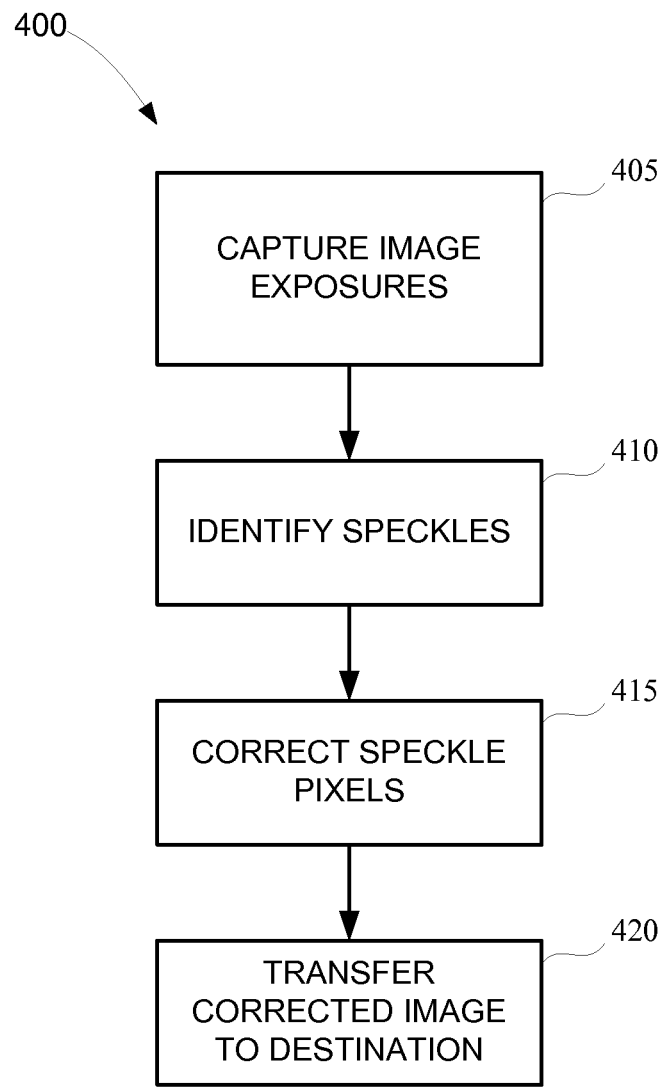
FIG. 4 is a flowchart illustrating one example embodiment of performing a speckle reduction operation.

FIG. 4 is a flowchart illustrating one example method 400 of performing a speckle reduction operation or function for an image capture operation using imaging device 100. At block 405, the image on media sheet S is captured by the camera. Such image capture is performed with only illuminator 302 turned on or illuminating (i.e., illuminator 304 is off). The image on media sheet S is then captured by the camera with only the illuminator 304 turned on or illuminating (i.e., illuminator 302 is off). In an alternate embodiment where more than two illuminators are present, the image on media sheet S may be captured by repeating for each illuminator this action of capturing the image on media sheet S with only one of illuminators illuminating or turned on and all other illuminators turned off. Thus, the image capture operation results in producing a number of exposures or images equal to the number of illuminators. In an alternate embodiment, image capture operation results in producing a number of exposures or images equal to the number of light sources. The exposures from the image capture operation then sent to processor 210 for image processing and speckle reduction. In some alternate example embodiments, the processor for image processing and speckle reduction is located remotely from imaging device. For example, the image processing processor may be located on a personal computer, server or other device.

At block 410, illuminance spikes or speckles in each of the exposures are identified by comparing the speckles in each of the exposures, such as on a pixel by pixel basis. If a spike is detected in one and only one exposure (i.e., the spike is unique to only one exposure), such pixel is identified or labeled as an illuminance spike. If a spike is detected in multiple exposures, such spike is assumed to be part of the image.

In one example embodiment, the exposure comparison is accomplished by calculating pixel averages on each exposure using known methods of generating averages. One such known method for calculating pixel averages is by applying a median filter to each exposure. In some example embodiments, pixel averages may be calculated using a mean filter.

Because illumination may not be uniform in areas designated for speckle reduction, in one example embodiment, only a portion or preset area of the speckle distribution in the exposures is utilized in determining whether illuminance spikes are present. Utilizing only a portion of the speckle distribution may be more robust by spatially shaping filter windows to select pixels expected to be most uniformly illuminated.

Figure 5:
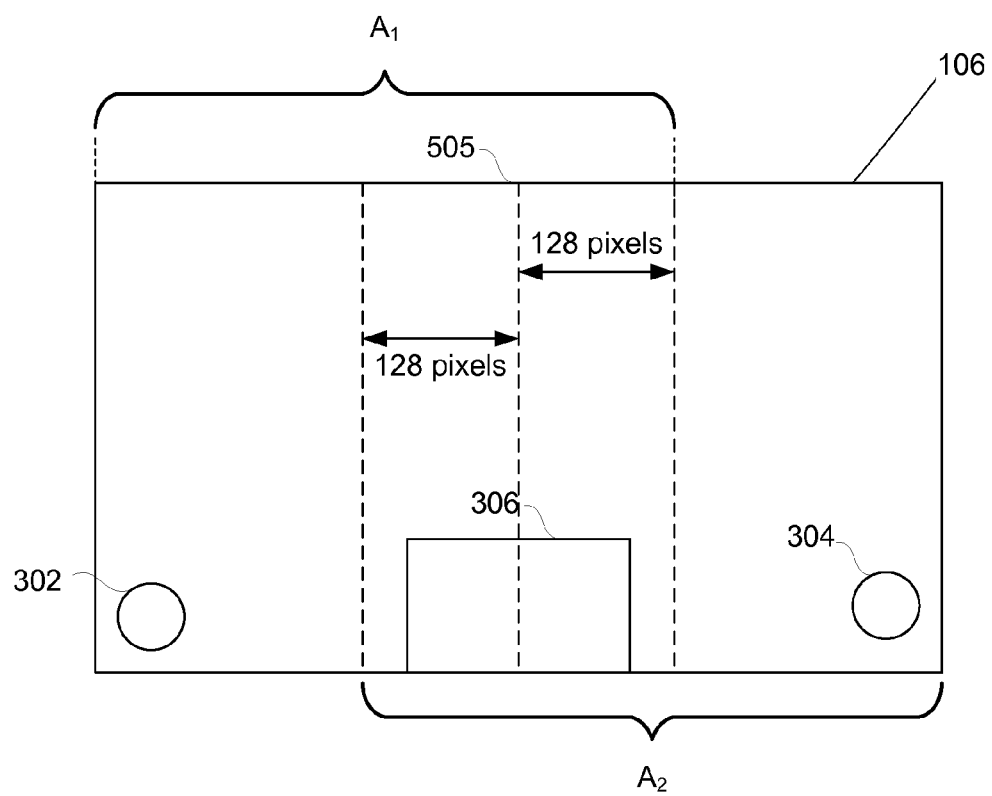
FIG. 5 is a top view of one example embodiment of the scan surface of an imaging device according to one example embodiment.

FIG. 5 shows a top view of one example embodiment of the scan surface 106. Camera 306 is located between illuminator 302 and illuminator 304. The center of scan surface 106 is the median line 505, and the preset area is based upon a predetermined number of pixels, such as 128, to the left or right of median line 505. For example, the preset area $A_1$ for the exposure taken with illuminator 302 may be 128 pixels to the right of median line 505, and the preset area $A_2$ for the exposure taken with illuminator 304 may be 128 pixels to the left of median line 505. In one aspect, the number of pixel may depend upon the sensor resolution and geometry of the ray diagrams from the sensor array 312 to the image capture window 106 and back to the illuminators 302, 304.

In another example embodiment, the preset area may be based upon a calibration performed by a manufacturer or a user. In yet another example embodiment, such preset area may also be a based upon a given percentage of the peak of the speckle distribution. In still another example embodiment, the preset area may be the half-width of the speckle distribution.

In some other example embodiments, the exposure comparison is accomplished by smoothing. Smoothing means collecting a histogram of values for a spatial window around the pixel being evaluated, then selecting the value corresponding to a largest smoothed count. To smooth histogram counts, 3 is added to the histogram count nearest a value, 2 is added to the histogram counts either side of that center count, and 1 is added to the pair of histogram counts one further away. Smoothing helps detect, for example, when the sum of an adjacent cluster of counts is greater than a relatively isolated count (binning artifacts). The order of operations for smoothing can be changed without affecting results, so that histogram smoothing can be done either while tabulating pixel values or later, while searching for a (lower-valued) smoothed peak count.

When smoothing, it may be advantageous to use only one of three color signals (red, green, blue) to determine whether a particular pixel location has speckle. Depending on optics, illumination spectral power distribution and sensor spectral sensitivities, speckles may be detected by a smoothed histogram more robustly from one color channel than others, but better correction occurs when applied to all color channels based on a single decision for each pixel, rather than independently per color channel.

Referring back to FIG. 4, once an illuminance spike is identified, the pixel value of the pixel identified as an illuminance spike may be corrected at block 415, and speckles in the image may be reduced. In one example embodiment, correction of the pixel may be accomplished by replacing the pixel value of the pixel identified as an illuminance spike with a median value of neighboring pixels from that exposure. In some other example embodiments, correction of the pixel may be accomplished by replacing the pixel value of the pixel identified as an illuminance spike with the corresponding pixel value of the same pixel in the other exposure. For example, if a pixel $P_1$ is identified as an illuminance spike in a first exposure or image, the pixel value of pixel $P_1$ may be replaced by the pixel value of pixel $P_1$ from the second exposure or image.

In still other example embodiments, correction of the pixel may be accomplished by replacing the pixel value of the pixel identified as an illuminance spike with the corresponding pixel value of the same pixel in the other exposure plus the smooth difference between exposures of neighborhood pixels, excluding speckle pixels in any exposure. Adding the smooth difference is advantageous because for unspeckled pixels, neighborhoods of pixel-to-pixel differences between exposures may be more likely to be more similar than pixel values within areas of either exposure. After completion of the speckle reduction, the exposures may be stitched using known stitching methods to form a corrected image.

The corrected image may then be transferred to its output destination (block 420). Such output destination may be printing a hard copy; storing the image in a database; and/or transferring the corrected image to another destination, such as e-mailing or faxing the corrected image.

As will be recognized by those skilled in the art, the speckle reduction operations presented herein are easily applicable to any imaging and/or printing devices such as color and black-and-white copiers, color and black-and-white printers, and so-called "all-in-one devices" that incorporate multiple functions such as scanning, copying, faxing and printing capabilities in one device without departing from the scope of the present disclosure.

The foregoing description of several methods and embodiments has been presented for purposes of illustration. It is not intended to be exhaustive or to limit the invention to the precise acts and/or forms disclosed, and obviously many modifications and variations are possible in light of the above teaching. It is intended that the scope of the invention be defined by the claims appended hereto.

What is claimed is:

1. A method for reducing specular reflection in an image, comprising:
    turning on a first of a plurality of light sources;
    capturing a first exposure of a scan surface while the first of the plurality of light sources is turned on;
    turning off the first of the plurality of light sources and turning on a second of the plurality of light sources different from the first of the plurality of light sources;
    capturing a second exposure of a scan surface while the second of the plurality of light sources is turned on and the first of the plurality of light sources is turned off;
    determining which pixels of the first and second exposures captured by the first and second light sources have speckles; and
    replacing a value of a pixel having been determined as having at least one speckle with a different pixel value, wherein the different pixel value corresponds to a pixel value in an exposure having no speckle plus a smooth difference between neighboring pixels next to the pixel having been determined as having said at least one speckle.

2. The method of claim 1, wherein the different pixel value corresponds to a pixel value in an exposure having no speckle.

3. The method of claim 2, wherein the determining comprises applying a median filter to at least one of the first exposure and the second exposure.

4. The method of claim 2, wherein the determining comprises applying a mean filter to a least one of the first exposure and the second exposure.

5. The method of claim 1, wherein the different pixel value corresponds to a median pixel value of neighboring pixels next to the pixel having been determined as having said at least one speckle.

6. The method of claim 1, further comprising: calculating pixel value averages prior to the determining.

7. The method of claim 1, wherein the speckles are pixels having a luminance spike in only one of the first exposure and the second exposure.

8. The method of claim 1, wherein the determining comprises identifying which pixels have a luminance spike in only one of the first exposure and the second exposure.

9. The method of claim 1, further comprising identifying a filter window based upon a speckle distribution centered around a median line.

10. The method of claim 9, wherein the preset area is a predetermined percentage of the peak of the speckle distribution.

11. The method of claim 9, wherein the preset area is the half-width of the speckle distribution.

12. The method of claim 9, wherein the preset area is a predetermined number of pixels to the left of the median line.

13. The method of claim 11, wherein predetermined number of pixels is approximately 128 pixels.

14. The method of claim 1, wherein the determining is performed on a preset area of the first exposure and the second exposure.

15. The method of claim 9, wherein the preset area is a predetermined number of pixels to the right of the median line.

16. The method of claim 1, wherein the plurality of light sources are contained in an imaging device.

17. The method of claim 1, further comprising: smoothing prior to the determining.

18. An imaging device for reducing specular reflection in an image, comprising:
a plurality of light sources;
an image capture unit; and
an image processor, wherein the image processor causes first and second light sources of the plurality of light sources to turn on and off at different times so that the image capture unit captures first and second exposures at times when either the first or second light source of the plurality of light sources is turned on but at a time when only one light source is turned on and wherein the image processor compares similar pixels in the first and second exposures to determine which of the pixels have speckles and replaces a value of a pixel having been determined as having at least one speckle with a different pixel value, wherein the different pixel value corresponds to a pixel value in an exposure having no speckle plus a smooth difference between neighboring pixels next to the pixel having been determined as having said at least one speckle.

* * * * *